United States Patent
Torosyan (10) Patent No.: US 11,469,438 B2
(45) Date of Patent: Oct. 11, 2022

(54) APPARATUS AND METHOD FOR HOLDING CIRCUIT FOR LASER WELDING

(71) Applicant: Faraday & Future Inc., Gardena, CA (US)

(72) Inventor: Hrayr Torosyan, Sunland, CA (US)

(73) Assignee: Faraday & Future Inc., Gardena, CA (US)

(*) Notice: Subject to any disclaimer, the term of this patent is extended or adjusted under 35 U.S.C. 154(b) by 103 days.

(21) Appl. No.: 15/942,317

(22) Filed: Mar. 30, 2018

(65) Prior Publication Data

US 2019/0326623 A1 Oct. 24, 2019

Related U.S. Application Data

(60) Provisional application No. 62/479,251, filed on Mar. 30, 2017.

(51) Int. Cl.
| | |
|---|---|
| *H01M 4/00* | (2006.01) |
| *H01M 50/287* | (2021.01) |
| *H01M 10/04* | (2006.01) |
| *B23K 26/21* | (2014.01) |
| *B23K 26/08* | (2014.01) |
| *B23K 26/10* | (2006.01) |
| *B23K 37/04* | (2006.01) |
| *B23K 101/36* | (2006.01) |

(52) U.S. Cl.
CPC ...... *H01M 10/0413* (2013.01); *B23K 26/0884* (2013.01); *B23K 26/10* (2013.01); *B23K 26/21* (2015.10); *B23K 37/0408* (2013.01); *B23K 2101/36* (2018.08)

(58) Field of Classification Search
None
See application file for complete search history.

(56) References Cited

U.S. PATENT DOCUMENTS

2006/0255764 A1* 11/2006 Cho .................... H01M 2/1077
320/116

* cited by examiner

*Primary Examiner* — Cynthia H Kelly
*Assistant Examiner* — Julian Anthony
(74) *Attorney, Agent, or Firm* — Knobbe Martens Olson & Bear, LLP (57) ABSTRACT

An apparatus for holding a circuit against a battery module includes a set of first fixtures for holding a set of first conductive tabs of the circuit against a corresponding set of positive terminals of the battery module, a set of second fixtures for holding a set of second conductive tabs of the circuit against a corresponding set of negative terminals of the battery module, and a rigid plate having a set of first structures therein for receiving the set of first fixtures and having a set of second structures therein for receiving the set of second fixtures.

11 Claims, 10 Drawing Sheets

APPARATUS AND METHOD FOR HOLDING CIRCUIT FOR LASER WELDING

CROSS-REFERENCE TO RELATED APPLICATIONS

This application claims the priority benefit of U.S. Provisional Application No. 62/479,251, filed Mar. 30, 2017, the entirety of which is hereby incorporated by reference.

TECHNICAL FIELD

The present disclosure relates generally to an apparatus and method of welding interconnecting circuitry to a battery module for a vehicle, and more particularly, to an apparatus and method of holding a circuit, for interconnecting battery cells, against a vehicle battery module during welding of the circuit to the vehicle battery module.

BACKGROUND

Battery-powered vehicles, such as electric vehicles or hybrid electric vehicles, may contain one or more high-voltage battery packs. The one or more high-voltage battery packs are used as a primary power source of a vehicle to drive various primary loads (e.g., traction motors) and various auxiliary loads (e.g., HVAC, lighting, pumps, etc.). A high-voltage battery pack may be configured to include one or more battery modules, with each battery module including a plurality of battery cells that are electrically interconnected with one another, either in series or in parallel. To ensure the proper function of a battery module, the plurality of battery cells of the battery module are required to be effectively electrically connected during the life span of the battery module. A circuit may be used to electrically connect the plurality of cells by welding the circuit to the battery module. The welding quality can affect the proper function of the battery module. For example, one or more gaps or non-welds between the circuit and the battery module caused by deficient welding, could be detrimental to the performance of the battery module.

The apparatus and method disclosed herein may be directed to addressing one or more of the problems set forth above and/or other problems in the prior art.

SUMMARY

One aspect of the present disclosure is directed to an apparatus for holding a circuit against a battery module. The apparatus includes a set of first fixtures for holding a set of first conductive tabs of the circuit against a corresponding set of positive terminals of the battery module. The apparatus further includes a set of second fixtures for holding a set of second conductive tabs of the circuit against a corresponding set of negative terminals of the battery module. In addition, the apparatus includes a rigid plate having a set of first structures therein for receiving the set of first fixtures and having a set of second structures therein for receiving the set of second fixtures. Each of the set of first structures and each of the set of second structures include a top recessed portion and a bottom recessed portion. The rigid plate is configured to be mounted to a structure holding the battery module.

Another aspect of the present disclosure is directed to a method of holding a circuit against a battery module. The method includes providing a set of first fixtures for holding a set of first conductive tabs of the circuit against a corresponding set of positive terminals of the battery module, and providing a set of second fixtures for holding a set of second conductive tabs of the circuit against a corresponding set of negative terminals of the battery module. The method further includes providing a rigid plate having a set of first structures therein for receiving the set of first fixtures and having a set of second structures therein for receiving the set of second fixtures. Each of the set of first structures and each of the set of second structures includes a top recessed portion and a bottom recessed portion. Additionally, the method includes engaging the set of first fixtures and the set of second fixtures with the rigid plate such that each of the first structure receives one of the set of first fixtures and each of the second structure receives one of the set of second fixtures. The method further includes disposing the rigid plate onto the circuit such that each of the set of first fixtures engages one of the set of first tabs to hold the one first tab against one corresponding positive terminal, and each of the set of second fixtures engages one of the set of second tabs to hold the one second tab against one corresponding negative terminal.

DETAILED DESCRIPTION

The disclosure is generally directed to an apparatus, and a method of using the apparatus, for holding a circuit against a battery module to facilitate welding the circuit to the battery module. The circuit as defined herein may include a flex circuit, a rigid circuit, or a rigid board. The circuit includes positive tabs (also referred to as first tabs described below) and negative tabs (also referred to as second tabs described below) for attachment by welding to the positive and negative terminals, respectively, of battery cells of the battery module. The positive and negative tabs are conductive tabs that are part of, and interconnected by, the circuit so that the tabs' connections to the positive and negative battery cells effects a desired interconnection of the respective cells of the battery module. The apparatus includes a set of first fixtures for holding a set of first tabs of the circuit against a corresponding set of positive terminals of the battery module, and a set of second fixtures for holding a set of second tabs of the circuit against a corresponding set of negative terminals of the battery module. The first and second fixtures may each perform like a spring when a force is exerted on them, thus individually bending and holding one tab of the circuit against a corresponding battery cell terminal of the battery module to create a zero-gap between the one tab and one corresponding battery cell terminal. The one tab is bent to contact with the battery cell and held in place for conducting laser welding. Zero-gap is used herein to characterize the contact between a bottom side of a tab of the circuit and the corresponding battery terminal as being direct physical contact sufficient to enable welding by directing a welding laser onto a top side of that tab. The zero-gap may significantly facilitate the welding of the circuit onto the battery module to improve the welding quality. The apparatus includes a rigid plate having a set of first structures therein for receiving the set of first fixtures and having a set of second structures therein for receiving the set of second fixtures. Each of the set of first structures and each of the set of second structures may include a top recessed portion and a bottom recessed portion. The recessed portions provide a landing surface for engaging the first and second fixtures, to prevent the first and second fixtures from rotating or moving from their intended positions. Further, upon the first and second fixtures being assembled into the rigid plate, the rigid plate may determine the spacing and orientation of the first and second fixtures and exert the force (e.g., a push force) against the first and second fixtures needed to bend and hold the tabs of the circuit in place.

Figure 1A:
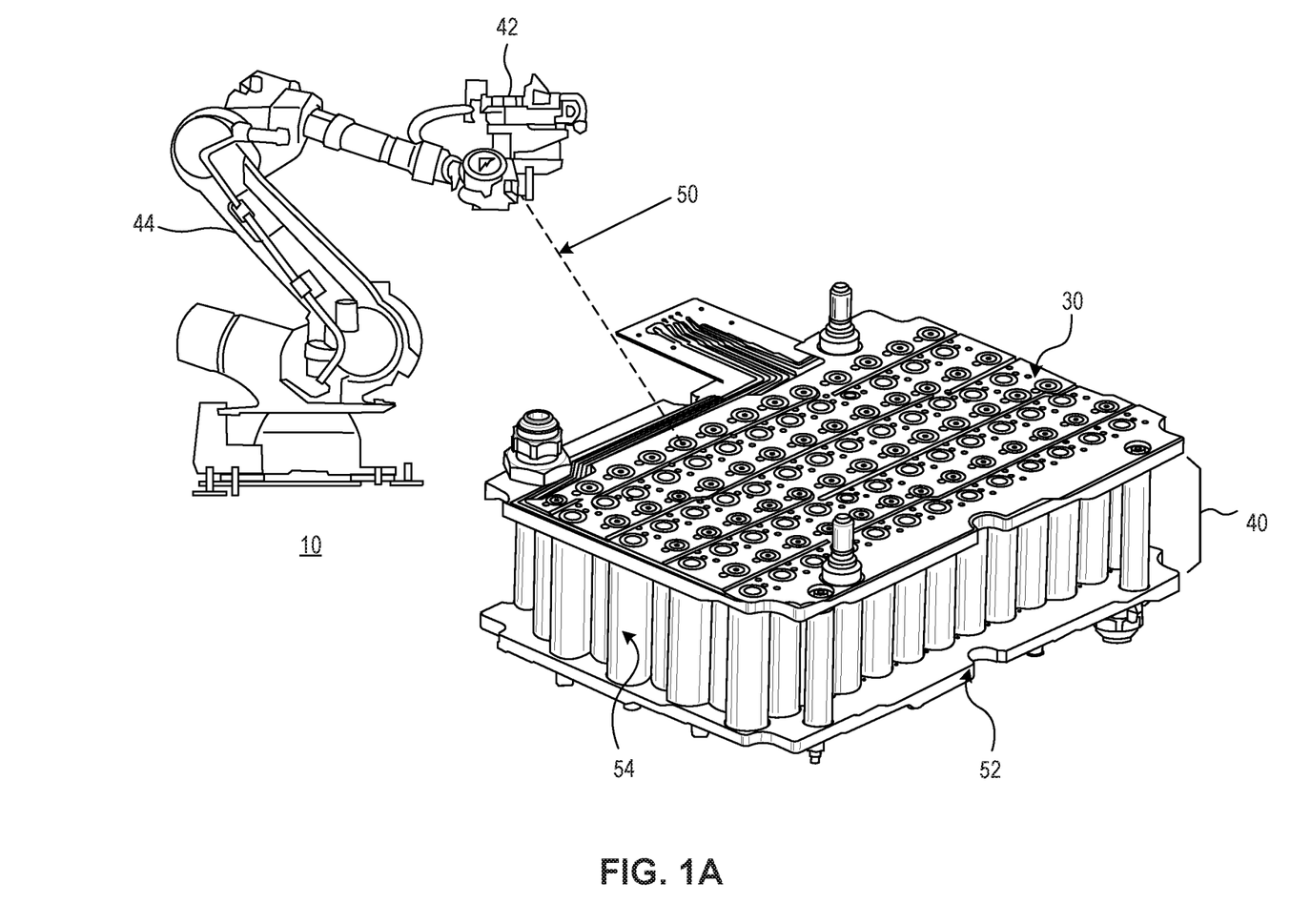
FIG. 1A is a diagrammatic illustration of an exemplary laser welding system, in which the apparatus and method of the present embodiment may be practiced.

FIG. 1A is a diagrammatic illustration of an exemplary laser welding system, in which the apparatus and method of the present embodiment may be practiced. The welding system includes a welding tool 10, a first workpiece 30, and a second workpiece 40. In the exemplary welding system of FIG. 1A, welding tool 10 includes laser 42 which acts as a heat source. Laser 42 is mounted to a robotic arm 44 or other means to direct the energy source to the desired area, which is configured to move laser 42 in multiple directions relative to first workpiece 30 and second workpiece 40.

Laser 42 may be configured to generate and direct one or more polarized laser beams 50 toward first workpiece 30 or second workpiece 40. Laser 42 may include, for example, one or more of an Excimer laser, a Yb:tunstates laser, a $CO_2$ laser, a Nd:YAG laser, a diode-pumped solid-state (DPSS) laser, or any other type of laser capable of heating workpieces to its welding temperature. In the disclosed embodiment, laser 42 is configured to produce laser beam 50 having a circular or square cross section, with a dimension (e.g., a diameter or width) that is proportional to a welded region. Laser 42 may also include a solid state laser, a gas laser, or a fiber laser First workpiece 30 is generally planar and provided as a circuit including positive and negative conductive tabs as described above. Second workpiece 40 is a battery module including a plurality of battery cells 54 (as will be described below in FIG. 1C). The battery module includes a support base 52 that provides mechanical support to, for example, the plurality of battery cells 54

Figure 1B:
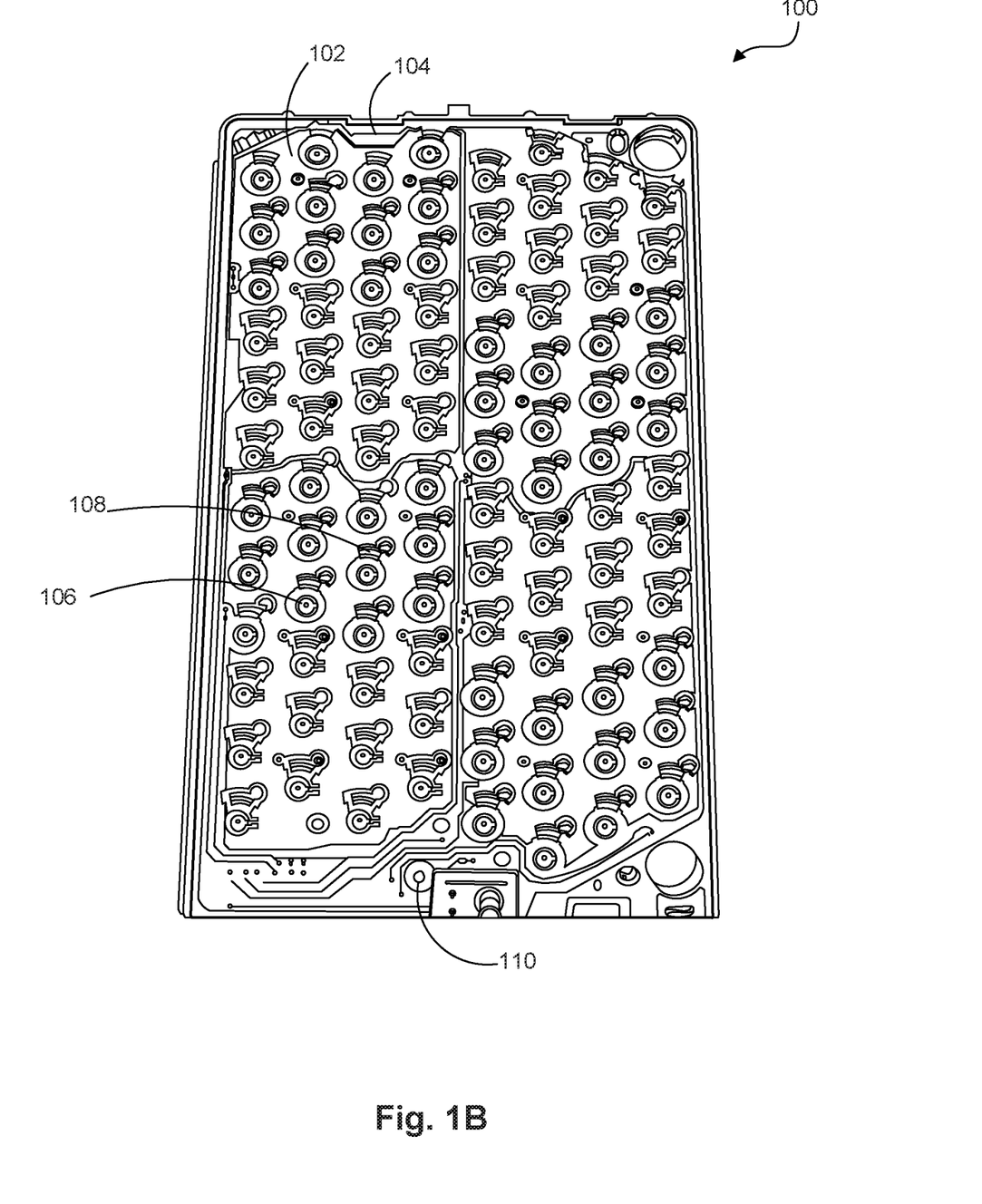
FIG. 1B is a schematic illustration of a top view of an exemplary circuit disposed on an exemplary battery module.

FIG. 1B is a schematic illustration of a top view 100 of an exemplary circuit 102 disposed on an exemplary battery module 104. Circuit 102 includes a set of first tabs 106 (also referred to as positive tabs herein) and a set of second tabs 108 (also referred to as negative tabs herein). Each of first tabs 106 may have a circular or round shape, and each of second tabs 108 may have a crescent or annular shape. Circuit 102 may also include a power bud 110 for connecting one side of battery module 104 to another side of battery module 104. Battery module 104 includes a plurality of battery cells such as shown in FIG. 1A. Each of the plurality of battery cells has a positive terminal and a negative terminal, such as will be shown in FIG. 1C. Upon welding of circuit 102 onto battery module 104, each of the set of first tabs of circuit 102 is physically and electrically connected to one corresponding positive terminal of one battery cell; and each of the set of second tabs of circuit 102 is physically and electrically connected to one corresponding negative terminal of one battery cell. Circuit 102 and battery module 104 may include further features and/or components that are not described herein.

Figure 1C:
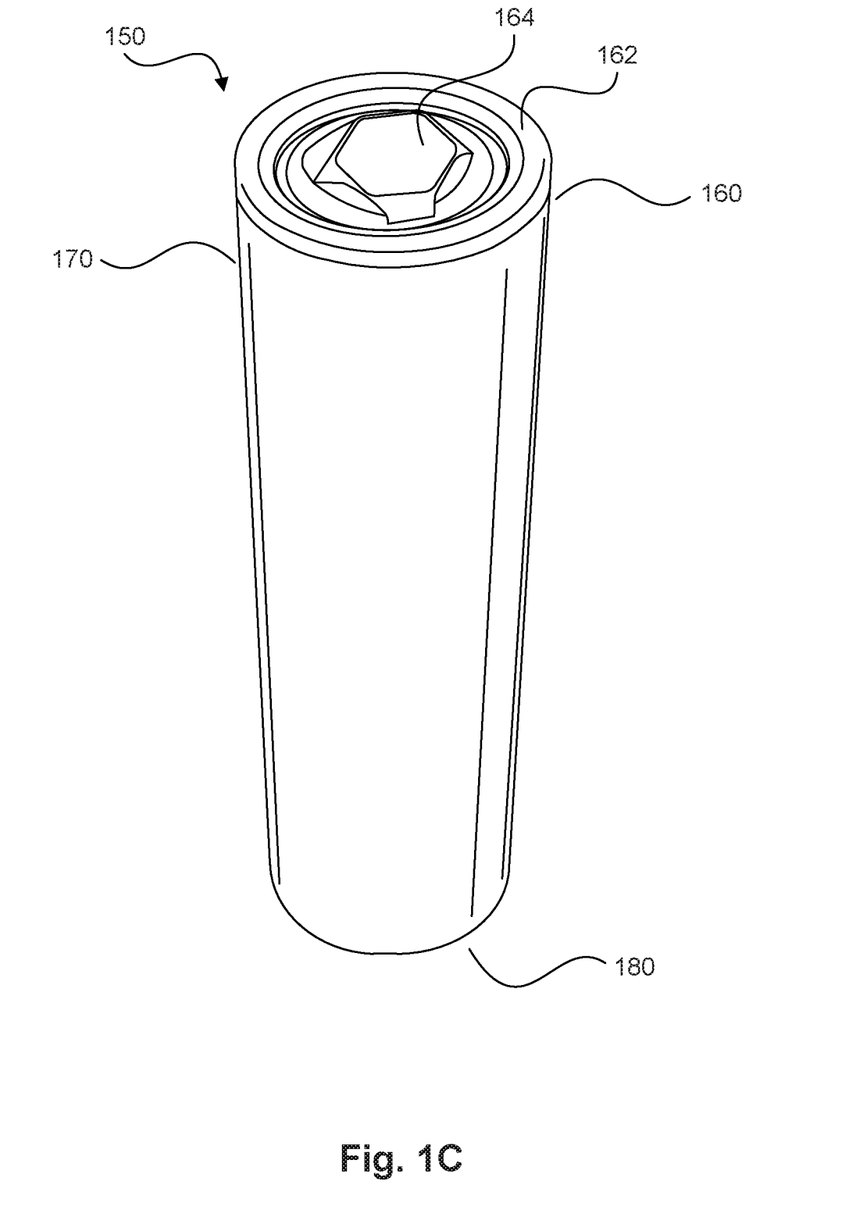
FIG. 1C is a schematic illustration of an exemplary battery cell positioned in the exemplary battery module of FIG. 1B.

FIG. 1C is a schematic illustration of an exemplary battery cell 150 positioned in the exemplary battery module of FIG. 1B. Battery cell 150 may be a lithium ion (li-ion) battery. For example, battery cell 150 may be an 18650 or 21700 type li-ion battery having a cylindrical shape with an approximate diameter of 18.6 mm and approximate length of 65.2 mm or 21.0 mm diameter and 70.0 mm height respectively. Other rechargeable battery form factors and chemistries may additionally or alternatively be used. In various embodiments, battery cell 150 includes a first end 160, a can 170 (e.g., the cylindrical body), and a second end 180. Both an anode terminal 162 and a cathode terminal 164 may be disposed on first end 160. Anode terminal 162 is a negative terminal of battery cell 150, and cathode terminal 164 is a positive terminal of battery cell 150. Anode terminal 162 and cathode terminal 164 are electrically isolated from each other by an insulator or dielectric.

Figure 2A:
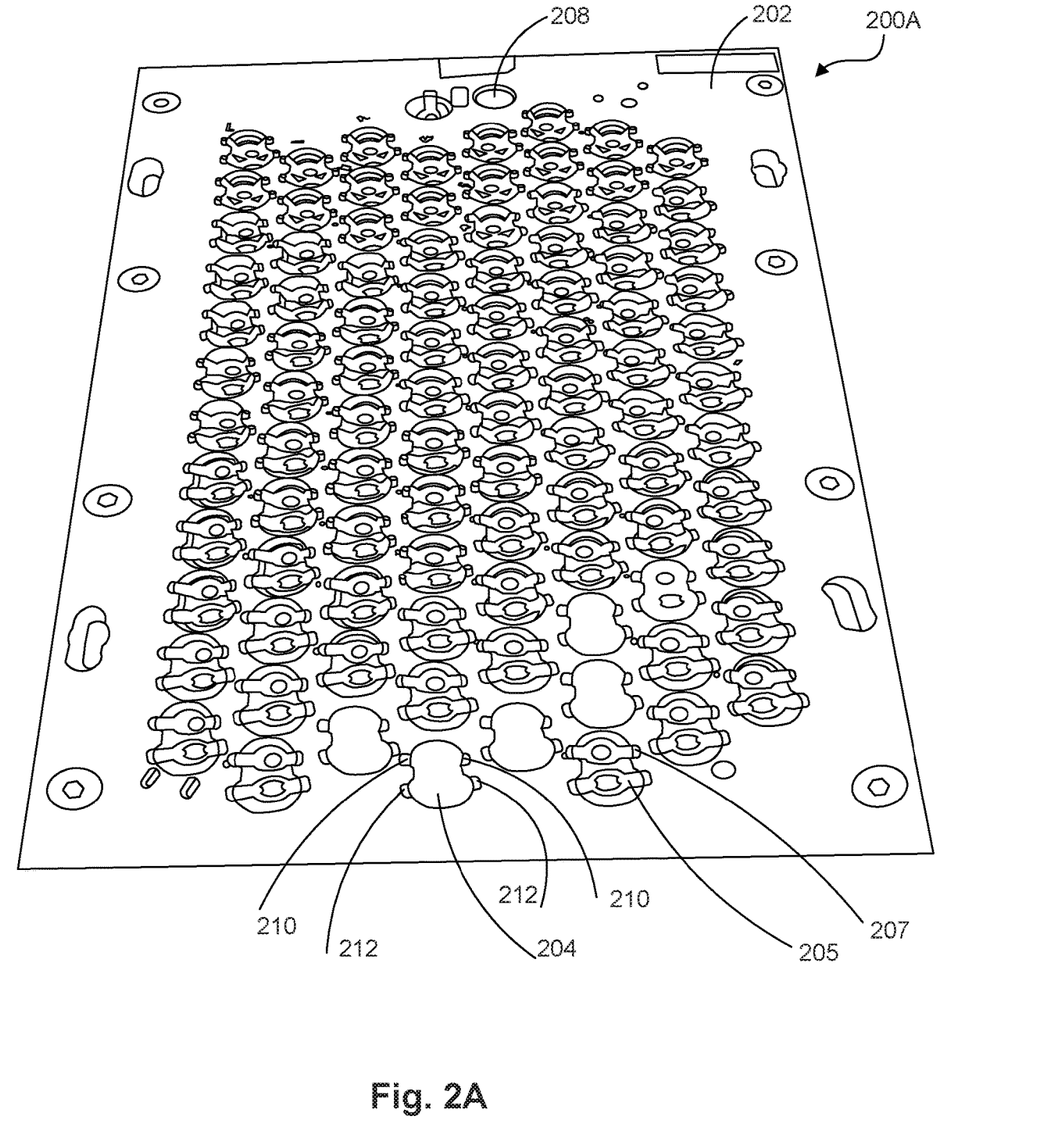
FIG. 2A is a schematic illustration of a top view of an exemplary rigid plate including a set of first structures and a set of second structures that may be used with the exemplary circuit of FIG. 1, according to an exemplary embodiment.

FIG. 2A is a schematic illustration of a top view 200A of an exemplary rigid plate 202 including a set of first structures and a set of second structures that may be used with the exemplary circuit of FIG. 1B, according to an exemplary embodiment of the disclosure. Rigid plate 202 includes a plurality of openings 204 each for receiving a first fixtures 205 and a second fixtures 207. Openings 204 are configured to be spatially distributed in plate 202. As illustrated in FIG. 2A, first fixtures 205 and second fixtures 207 are mounted in most openings 204, while several openings 204 are shown without fixtures 205,207 mounted therein, for illustrative purposes. In addition, first fixtures 205 and second fixtures 207 may be mounted in respective separate openings 204. Further, openings 204 are configured to include top recessed portions 210, 212 to facilitate mounting fixtures 205,207 therein. Top recessed portions 210 and top recessed portions 212 may have a depth D1 and D2, respectively. The depths D1 and D2 may be the same or different. Various embodiments of first fixture 205 and second fixture 207 will be described below.

Rigid plate 202 may also include alignment features, for example, one or more holes or slots 208 used to align rigid plate 202 with respect to a battery module (e.g., battery module 104 in FIG. 1B). Rigid plate 202 may have a shape and dimensions (e.g., length and width) that corresponds to a shape and dimensions of a circuit upon which rigid plate 202 may be positioned (e.g., circuit 102 in FIG. 1B). Further, rigid plate 202 may be constructed of any suitable material including, but not limited to, steel, stainless steel, aluminum, iron, copper and/or bronze that is able to provide a desired rigidity. Rigid plate 202 may have a thickness that depends on the material of which rigid plate 202 is constructed. Rigid plate is further configured to be attached to a structure holding the battery module, such as support base 52 in FIG. 1A, in order to be clamped against and exert a force on circuit 102. Rigid plate 202 may include further features and/or components that are not described herein.

Figure 2B:
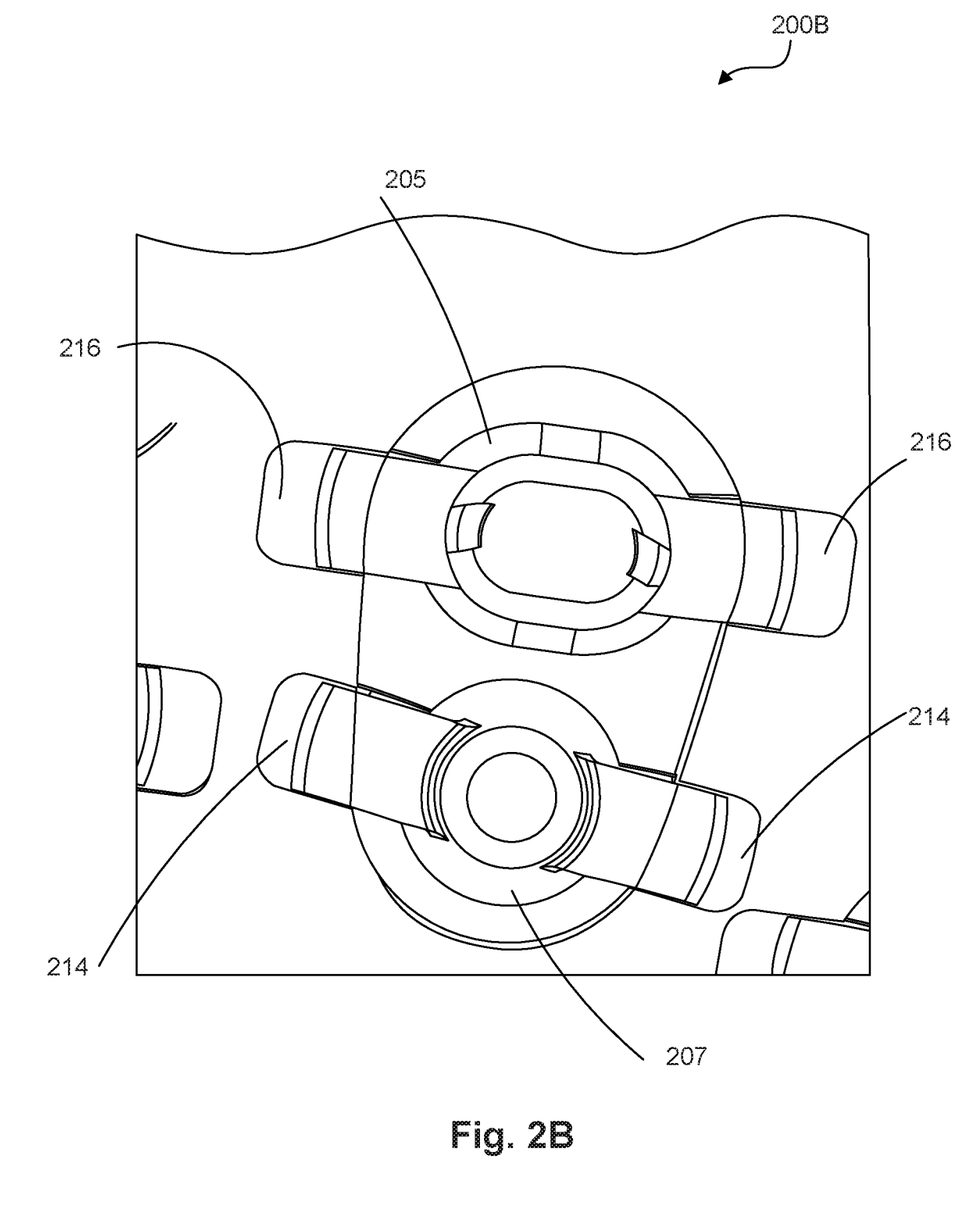
FIG. 2B is a schematic illustration of a bottom view of a portion of the exemplary rigid plate in FIG. 2A taken along 2B-2B of FIG. 2A.

FIG. 2B is a schematic illustration of a bottom view 200B of a portion of exemplary rigid plate 202 in FIG. 2A. As illustrated in FIG. 2B, openings 204 are configured to include bottom recessed portions 214, 216 to facilitate mounting fixtures 205,207 therein. Bottom recessed portions 214 having a depth D3 correspond to top recessed portions 210, and bottom recessed portions 216 having a depth D4 correspond to top recessed portions 212. The depths D3 and D4 may be the same or different. Further, the depths D1 and D3 may be the same or different, and the depths D2 and D4 may be the same or different. Opening 204 is also referred to herein as a first structure 204 for having mounted therein, at least, one of first fixtures 205. In some embodiments, rigid plate 202 is constructed to provide separate openings for mounting second fixtures 207, such separate openings being referred to herein as second structures 206. Also, as described above, opening 204 may be configured to receive both fixtures 205 and 207, and thereby include both first structure 204 and second structure 206.

In some embodiments, second structure 206 is configured to include an aperture, a top recessed portion, and a bottom recessed portion. The top recessed portion and the bottom recessed portion of second structure 206 may have respective depths that are the same or different. Further, first structure 204 and second structure 206 may have the same configuration and the same dimensions, or may have different configurations and dimensions, which may depend on a configuration of circuit 102 upon which rigid plate 202 is positioned. The configuration of circuit 102 is in part determined by the shape and dimension of first tab 106 and the shape and dimension of second tab 108.

Figure 3A:
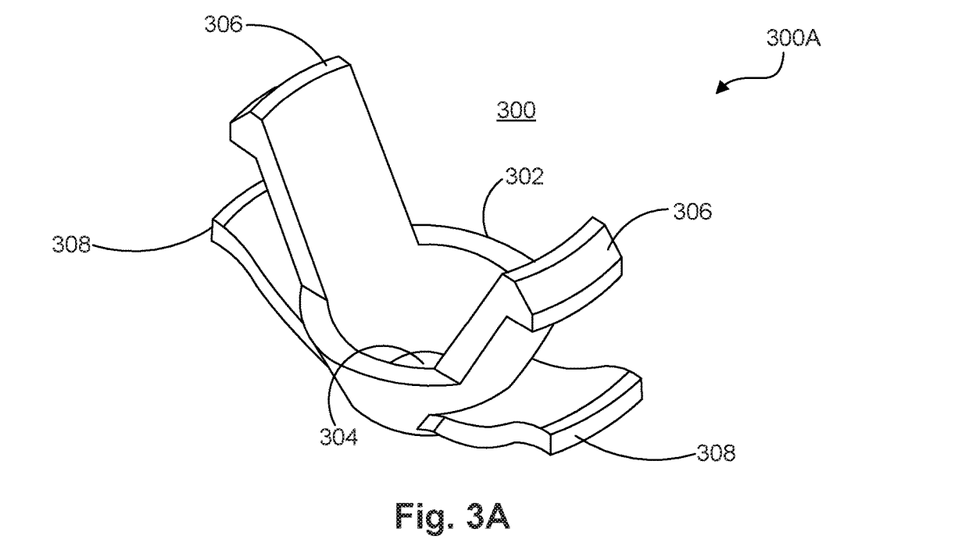
FIG. 3A is a schematic illustration of a perspective view of an exemplary first fixture that may be used with the exemplary rigid plate in FIG. 2A, according to an exemplary embodiment.

FIG. 3A is a schematic illustration of a perspective view 300A of an exemplary first fixture 300 that may be used with exemplary rigid plate 202 in FIG. 2A, according to an exemplary embodiment. First fixture 300 includes a body 302, an aperture or hole 304, a pair of hold-in-place tabs 306, and a pair of spring tabs 308. Aperture 304 is configured to be substantially centered in body 302 and to allow a laser beam to pass through for welding one first tab of circuit 102 to one corresponding positive terminal of a battery cell in battery module 104. The angle at which aperture 304 is opened is selected to allow the laser beam not to be blocked. Tabs 306 connect to body 302 and partially form the angle at which aperture 304 is opened. Tabs 306 are configured to snap first fixture 300 into one of first structures 204 to hold first fixture 300 in place so as not to allow first fixture 300 to fall out of rigid plate 202. Tabs 308 connect to a lower portion of body 302 and are configured to engage rigid plate 202. Tabs 308 allow first fixture 300 to flex through a distance sufficient to exert a force on and hold first tab 106 in place against one corresponding positive terminal of a battery cell in a battery module (e.g., battery module 102), so there is a zero-gap between first tab 106 and the corresponding positive terminal. Further, tabs 308 may be below the pair of hold-in-place tabs 306, respectively.

Figure 3B:
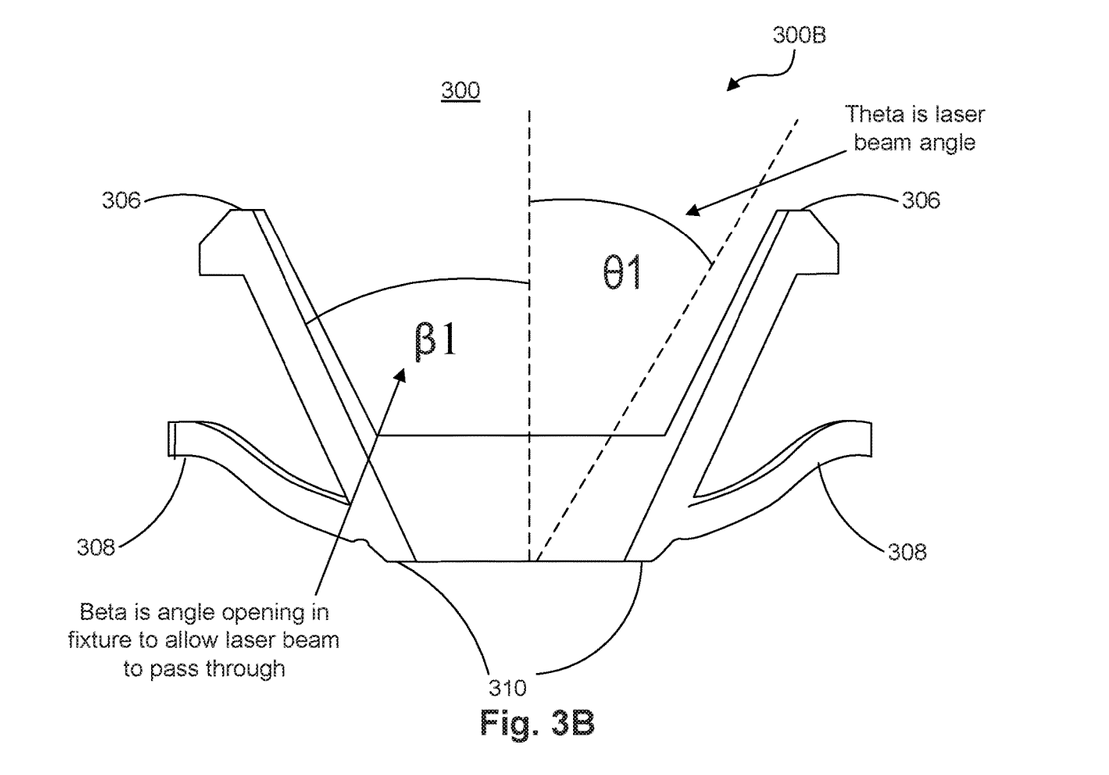
FIG. 3B is a schematic illustration of a cutout cross-sectional view of the exemplary first fixture in FIG. 3A.

FIG. 3B is a schematic illustration of a cutout cross-sectional view 300B of the exemplary first fixture 300 in FIG. 3A. As illustrated in FIG. 3B, first fixture 300 further includes a flat push-down surface 310 substantially forming a bottom surface of first fixture 300. Flat push-down surface 310 is configured to contact with one of first tabs 106 and push the one of first tabs 106 against one corresponding positive battery terminal. In some embodiments, flat push-down surface 310 may be coated with a material that withstands wear and high temperatures, for example a ceramic coating that protects from heat as well as wear. FIG. 3B further depicts an angle β1 at which aperture 304 is opened to allow a laser beam to pass through aperture 304, and an angle θ1 at which the laser beam is directed.

The material of which first fixture 300 is formed may be selected based on the particular application of first fixture 300. In this exemplary embodiment, the material may be selected to withstand high temperatures experienced during laser beam welding and exhibit spring-like characteristics. For example, first fixture 300 may be formed of an elastic material that withstands a temperature at least as high as a predetermined temperature (e.g., a melting temperature of the elastic material). For example, a first fixture made of steel (having a melting temperature of, e.g., about 1510 degree Celsius) may withstand the melting temperature of copper at 1085 degrees Celsius that may be used to form tabs of circuit 102. Alternatively, the fixtures may be made of any steel, having a suitably high melting point, that would provide a spring force, such as spring steel, stainless steel (having a melting point of about 2000 degree F.) or steel that is tempered or work hardened. Further alternatively, the fixtures may be made of plastic (such as PEEK or higher temperature plastics) that can withstand the laser power during a welding process. The selection of the material for the fixtures may depend on the amount of force required to be generated during clamping and what localized temperatures the fixtures will experience during a laser welding operation. In some embodiments, spring tabs 308 may be modified to allow for larger or smaller spring force based on the application of first fixture 300.

Figure 4A:
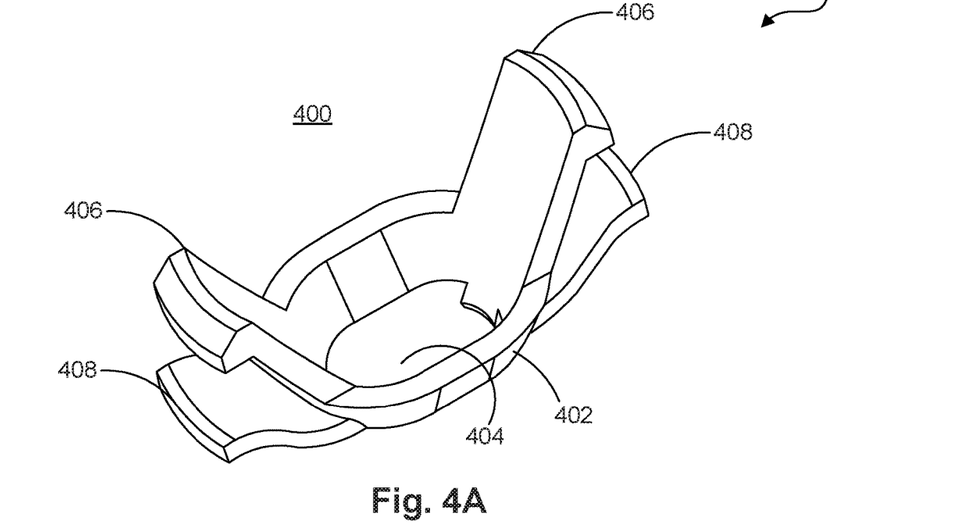
FIG. 4A is a schematic illustration of a perspective view of an exemplary second fixture that may be used with the exemplary rigid plate in FIG. 2A, according to an exemplary embodiment.

FIG. 4A is a schematic illustration of a perspective view 400A of an exemplary second fixture 400 that may be used with exemplary rigid plate 202 in FIG. 2A, according to an exemplary embodiment. Second fixture 400 includes a body 402, an aperture or hole 404, a pair of hold-in-place tabs 406, and a pair of spring tabs 408. Aperture 404 is configured to be substantially centered in body 402 and to allow a laser beam to pass through for welding one second tab of circuit 102 to one corresponding negative terminal of a battery cell in battery module 104. The angle at which aperture 404 is opened is selected to allow the laser beam not to be blocked. Tabs 406 connect to body 402 and partially form the angle at which aperture 404 is opened. Tabs 406 are configured to snap second fixture 400 into one of second structures 206 to hold second fixture 400 in place so as not to allow second fixture 400 to fall out of rigid plate 202. Tabs 408 connect to a lower portion of body 402 and are configured to engage rigid plate 202. Tabs 408 allow second fixture 400 to flex through a distance sufficient to exert a force on and hold second tab 108 in place against one corresponding negative terminal of a battery cell in a battery module (e.g., battery module 102), so there is a zero-gap between second tab 108 and the corresponding negative terminal. Further, tabs 408 may be below the pair of hold-in-place tabs 406, respectively.

Figure 4B:
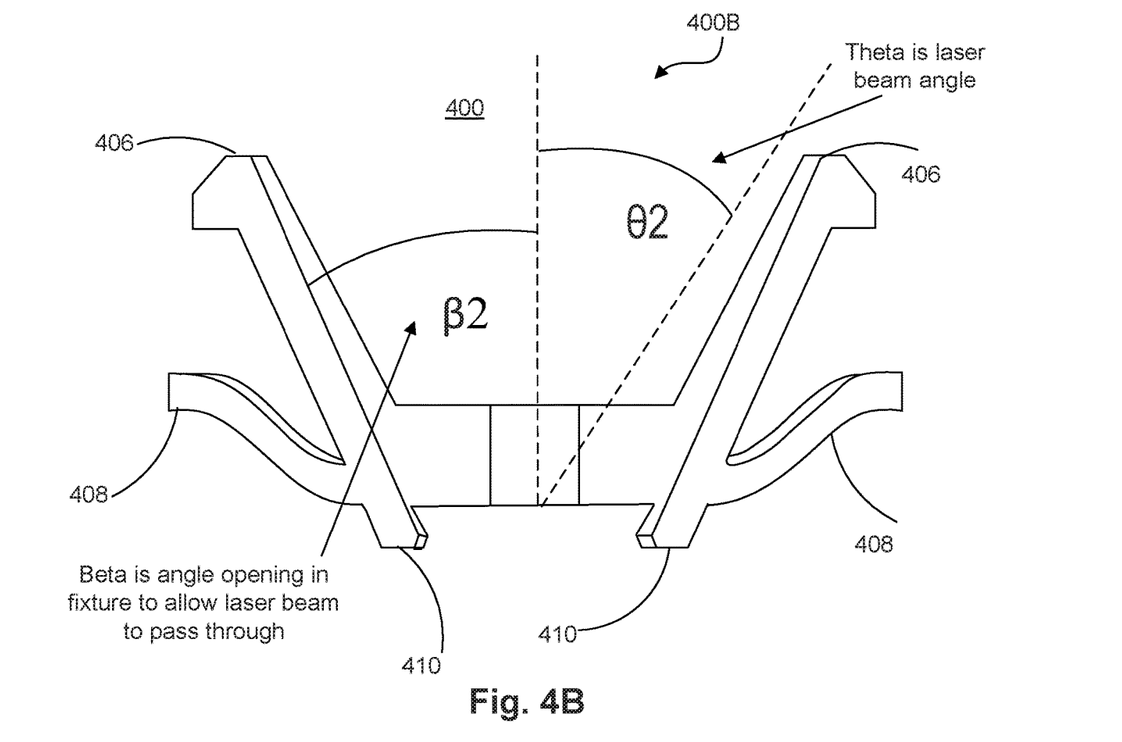
FIG. 4B is a schematic illustration of a cutout cross-sectional view of the exemplary second fixture in FIG. 4A.

FIG. 4B is a schematic illustration of a cross-sectional view 400B of the exemplary second fixture in FIG. 4A. As illustrated in FIG. 4B, second fixture 400 further includes a flat push-down surface 410 forming a portion of a bottom surface of second fixture 400. Flat push-down surface 410 is configured to contact with one of second tabs 108 and push the one of second tabs 108 against one corresponding negative battery terminal. In some embodiments, push-down surface 410 may be configured to conform to a shape and/or dimension of second tab 108 of circuit 102. For example, push-down surface 410 may be configured to conform to a crescent shape of the second tab to ensure even distribution of force and surface contact. In some embodiments, flat push-down surface 410 may be coated with a material that withstands wear and high temperatures, for example a ceramic coating that protects from heat as well as wear. FIG. 4B further depicts an angle β2 at which aperture 404 is opened to allow a laser beam to pass through aperture 404, and an angle θ2 at which the laser beam is directed.

The material of which first fixture 400 is formed may be selected based on the particular application of first fixture 400. In this exemplary embodiment, the material may be selected to withstand high temperatures experienced during laser beam welding and exhibit spring-like characteristics. For example, second fixture 400 may be formed of an elastic material that withstands a temperature at least as high as a predetermined temperature, e.g., a melting temperature of the elastic material. For example, a second fixture made of steel (having a melting temperature about 1510 degrees Celsius) may withstand the melting temperature of copper at 1085 degrees Celsius that may be used to form tabs of circuit 102. Alternatively, the fixtures may be made of any steel, having a suitably high melting point, that would provide a spring force, such as spring steel, stainless steel (having a melting point of about 2000 degrees F.) or steel that is tempered or work hardened. Further alternatively, the fixtures may be made of plastic (such as PEEK or higher temperature plastics) that can withstand the laser power during a welding process. The selection of the material for the fixtures may depend on the amount of force required to be generated during clamping and what localized temperatures the fixtures will experience during a laser welding operation. In some embodiments, spring tabs 408 may be modified to allow for larger or smaller spring force based on the application of second fixture 400.

In this disclosure, both first fixture 300 and second fixture 400 may also be generally referred to as hold-down fixtures that hold down circuit tabs (including first tab 106 and second tab 108) against the battery cell terminals creating a zero-gap between the interface of the circuit tab and corresponding battery terminal. Each hold-down fixture (first fixture 300 and second fixture 400) independently applies a force required to bend and hold each circuit tab in place. As mentioned previously, hold-down fixtures 300,400 may be made of any suitable materials and by any suitable method or process. For example, hold-down fixtures 300,400 may be 3D printed with a PA2200 material with an adhesive binder added for strength and flexibility. Additionally, individual hold down fixtures 300,400 each act like a spring when a force is applied to them. When hold-down fixtures 300,400 are installed or assembled into a rigid plate (e.g., one first fixture 300 being received/housed in one first structure 204 and one second fixture 400 being received/housed in one second structure 206), rigid plate 202 determines spacing and orientation of hold-down fixtures 300,400 and provides a push force needed to bend and hold circuit tabs 106,108 in place. Further, hold-down fixtures 300,400 may be located with respect to the battery module by using alignment features of rigid plate 202 (e.g., hole and/or slot), ensuring that hold-down fixtures 300,400 may be aligned to the positive and negative terminals of the battery cells.

Figure 5A:
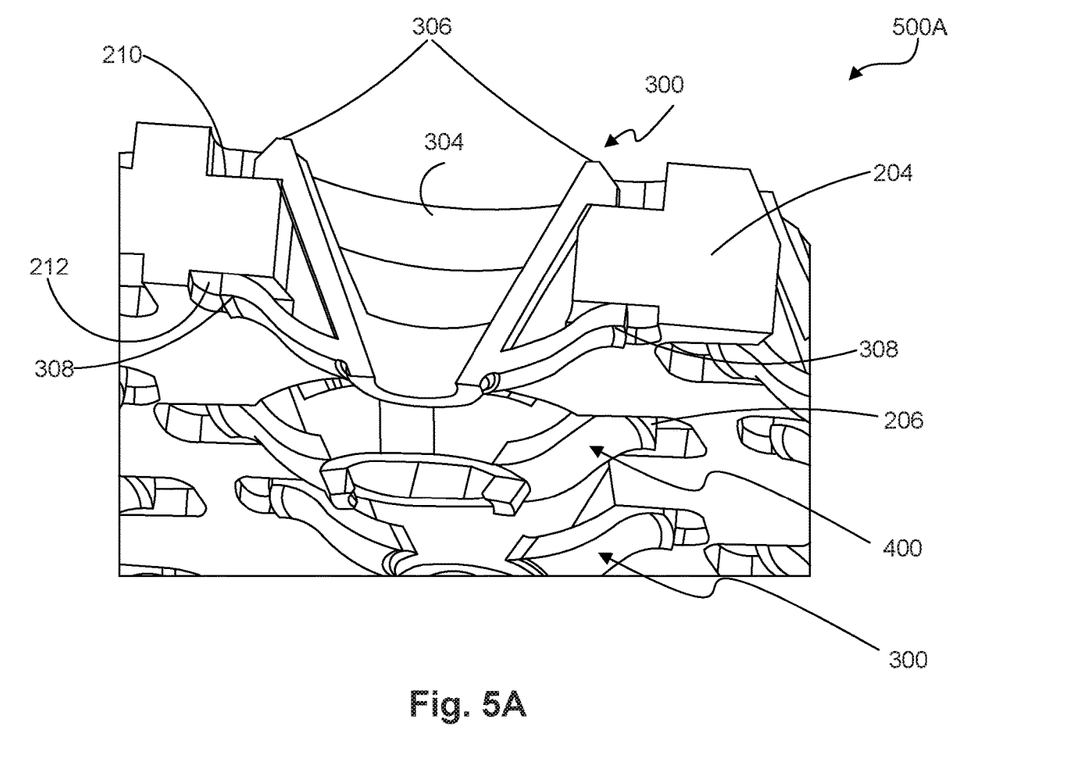
FIG. 5A is a schematic illustration of a cross-sectional view of the exemplary first fixture engaged with one of the first structures of the exemplary rigid plate.

FIG. 5A is a schematic illustration of a side view 500A of the exemplary first fixture 300 engaged with one of first structures 204 of exemplary rigid plate 202. As shown in FIG. 5A, first fixture 300 is installed/received in one of first structures 204 of rigid plate 202. Hold-in-place tabs 306 are engaged with top recessed portions 210 of first structure 204 that provide landing surfaces for hold-in-place tabs 306 to engage and prevent hold-in-place tabs 306 from rotating or moving from their intended positions. Spring tabs 308 are engaged with bottom recessed portions 212 of first structure 204 that provide a landing surface for spring tabs 308 to engage and prevent spring tabs 308 from rotating or moving from their intended positions. Further, bottom recessed portions 212 provide a space for spring tabs 308 to extend outward upon a pushing/compressive force being transferred to first fixture 300 from rigid plate 202, thus pushing flat push-down surface 310 against one corresponding first tab 106 to engage the one corresponding first tab 106 with one corresponding positive terminal of battery cell. A laser beam can pass through aperture 304 for welding together the one corresponding first tab 106 and the one corresponding positive terminal of the battery cell while the one corresponding first tab 106 is pushed against the one corresponding positive terminal of the battery cell with a zero gap there between.

Figure 5B:
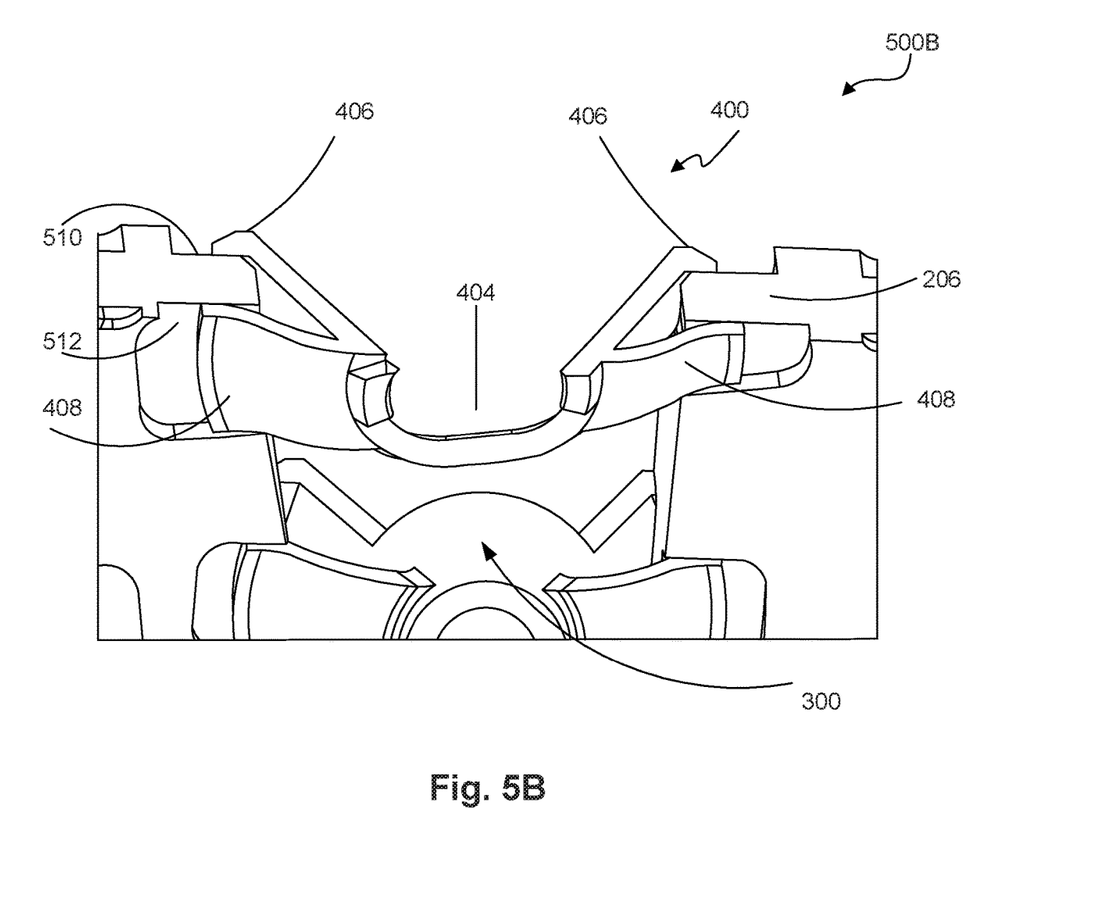
FIG. 5B is a schematic illustration of a cross-sectional view of the exemplary second fixture engaged with one of the second structures of the exemplary rigid plate.

FIG. 5B is a schematic illustration of a cross-sectional view 500B of the exemplary second fixture 400 engaged with one of the second structures 206 of the exemplary rigid plate 202. As shown in FIG. 5B, second fixture 400 is shown as partially cut away and installed/received in one of second structures 206 of rigid plate 202. Hold-in-place tabs 406 are engaged with top recessed portions 510 of second structure 206 that provide a landing surface for hold-in-place tabs 406 to engage and prevent hold-in-place tabs 406 from rotating or moving from their intended positions. Spring tabs 408 are engaged with bottom recessed portions 512 of second structure 206 that provide a landing surface for spring tabs 408 to engage and prevent spring tabs 408 from rotating or moving from their intended positions. Further, bottom recessed portions 512 provide a space for spring tabs 408 to extend outward upon a pushing/compressive force being transferred to second fixture 400 from rigid plate 202, thus pushing flat push-down surface 410 against one corresponding second tab 108 to engage the one corresponding second tab 108 with one corresponding negative terminal of a battery cell. A laser beam can pass through aperture 404 for welding together the one corresponding second tab 108 and the one corresponding negative terminal of the battery cell while the one corresponding second tab 108 is pushed against the one corresponding negative terminal of the battery cell with a zero gap there between.

Figure 6:
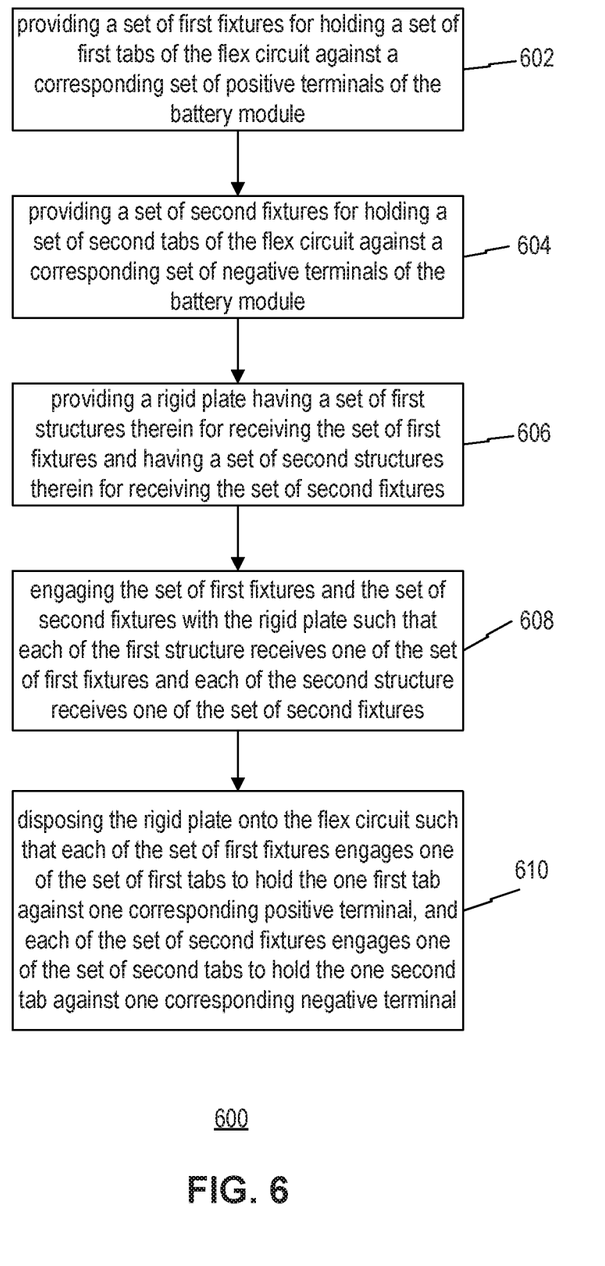
FIG. 6 is a flowchart illustrating an exemplary method that may be performed for holding a circuit against a battery module, according to an exemplary embodiment.

FIG. 6 is a flowchart illustrating an exemplary method 600 of using rigid plate 202 and hold-down fixtures 300,400 that may be performed for holding circuit 102 against battery module 104, according to an exemplary embodiment of the disclosure.

Step 602 includes providing a set of first fixtures for holding a set of first tabs of circuit 102 against a corresponding set of positive terminals of the battery module. For example, the set of first fixtures may be a set of first fixtures 300.

Step 604 includes providing a set of second fixtures for holding a set of second tabs of circuit 102 against a corresponding set of negative terminals of the battery module. For example, the set of second fixtures may be a set of second fixtures 400.

Step 606 includes providing a rigid plate having openings, including a set of first structures for receiving the set of first fixtures and a set of second structures therein for receiving the set of second fixtures. For example, the rigid plate may be rigid plate 202, the set of first structures may be the set of first structures 204, and the set of second structures may be the set of second structures 206. Each of the set of first structures and each of the set of second structures may include a top recessed portion (e.g., top recessed portion 210) and a bottom recessed portion (e.g., bottom recessed portion 212).

Step 608 includes engaging the set of first fixtures and the set of second fixtures with rigid plate 202 such that each of the first structures receives one of the set of first fixtures and each of the second structures receives one of the set of second fixtures. For example, the set of first fixtures 300 and the set of second fixtures 400 may be installed into the set of first structures 204 and the set of second structures 206, as illustrated in FIGS. 5A and 5B, respectively.

Step 610 includes disposing rigid plate 202 onto the circuit such that each of the set of first fixtures engages one of the set of first tabs to hold the one first tab against one corresponding positive terminal, and each of the set of second fixtures engages one of the set of second tabs to hold the one second tab against one corresponding negative terminal. For example, upon positioning rigid plate 202 onto circuit 102, the set of first fixtures 300 and the set of second fixtures 400 pushes the set of first tabs 106 and the set of second tabs 108 against the corresponding positive and negative terminals of battery cells in battery module 104, respectively, thus holding the flex tabs against the battery terminals with a zero-gap there between for welding them together by a laser beam passing through apertures of the hold-down fixtures.

In some embodiments, the method may further include providing at least one or more of holes or slots in rigid plate 202 to align the set of first fixtures and the set of second fixtures with the set of positive terminals and the set of negative terminals of the battery module, respectively. For example, hole or slot 208 may be used to align the hold-down fixtures with the corresponding battery terminals of battery module 104.

In some embodiments, the method may further include providing, by rigid plate 202, a force to the set of first fixtures and the set of second fixture to hold the set of first tabs and the set of second tabs of the circuit against the set of positive terminals and the set of negative terminals of the battery module, respectively. For example, a pushing or compressive force may be applied to rigid plate 202 and transferred to the hold-down fixtures via rigid plate 202.

In some embodiments, the method may further include forming the set of first fixtures and the set of second fixtures of an elastic material that withstands a temperature at least as high as a predetermined temperature.

In some embodiments, the method may further include providing each of the first fixtures with an aperture positioned substantially in the center of the first fixture, the aperture being intended for passing a laser beam for welding each of the first tabs with one corresponding positive terminal of a battery cell in a battery module.

In some embodiments, the method may further include providing each of the second fixtures with an aperture positioned substantially in the center of the second fixture, the aperture being intended for passing a laser beam for welding each of the second tabs with one corresponding negative terminal of a battery cell in a battery module.

It will be apparent to those skilled in the art that various modifications and variations can be made to the disclosed apparatus and method of welding a battery module. Other embodiments will be apparent to those skilled in the art from consideration of the specification and practice of the disclosed apparatus and method of welding a battery module. It is intended that the specification and examples be considered as exemplary only, with a true scope being indicated by the following claims and their equivalents.

What is claimed is:

1. An apparatus for holding a circuit against a battery module, the apparatus comprising:
    a set of first fixtures for holding a set of first conductive tabs of the circuit against a corresponding set of positive terminals of the battery module;
    a set of second fixtures for holding a set of second conductive tabs of the circuit against a corresponding set of negative terminals of the battery module; and
    a rigid plate having a set of first structures therein for receiving the set of first fixtures and having a set of second structures therein for receiving the set of second fixtures, each of the set of first structures and each of the set of second structures including a top recessed portion and a bottom recessed portion, and the rigid plate configured for mounting to a structure holding the battery module;
    wherein each of the first fixtures includes an aperture positioned substantially in a center of the first fixture, the aperture for passing a laser beam for welding each of the first tabs with one corresponding positive terminal of the battery module; and
    wherein each of the first fixtures further includes a body having the aperture therein, a pair of hold-in-place tabs connected to the body, a pair of spring tabs connected to the body and below the pair of hold-in-place tabs, and a flat push-down surface formed at a bottom surface of the first fixture.

2. The apparatus of claim 1, wherein the rigid plate further includes at least one of holes or slots for aligning the set of first fixtures and the set of second fixtures with the set of positive terminals and the set of negative terminals of the battery module, respectively.

3. The apparatus of claim 1, wherein the rigid plate provides a force to the set of first fixtures and the set of second fixtures to hold the set of first tabs and the set of second tabs of the circuit against the set of positive terminals and the set of negative terminals of the battery module, respectively.

4. The apparatus of claim 1, wherein the set of first fixtures and the set of second fixtures are formed of an elastic material that is coated to withstand temperatures at least as high as a predetermined temperature.

5. The apparatus of claim 1, wherein the pair of hold-in-place tabs are configured to position the first fixture into one corresponding first structure and engage a pair of the top recessed portions of the one corresponding first structure.

6. The apparatus of claim 1, wherein the pair of spring tabs are configured to engage a pair of the bottom recessed portions of one corresponding first structure.

7. The apparatus of claim 1, wherein the flat push-down surface is configured to engage one corresponding first tab to hold the one corresponding first tab against the one corresponding positive terminal of the battery module.

8. An apparatus for holding a circuit against a battery module, the apparatus comprising:

a set of first fixtures for holding a set of first conductive tabs of the circuit against a corresponding set of positive terminals of the battery module;

a set of second fixtures for holding a set of second conductive tabs of the circuit against a corresponding set of negative terminals of the battery module; and a rigid plate having a set of first structures therein for receiving the set of first fixtures and having a set of second structures therein for receiving the set of second fixtures, each of the set of first structures and each of the set of second structures including a top recessed portion and a bottom recessed portion, and the rigid plate configured for mounting to a structure holding the battery module;

wherein each second fixture of the set of second fixtures includes an aperture positioned substantially in a center of the second fixture, the aperture for passing a laser beam for welding each of the second tabs with one corresponding negative terminal of the battery module; and wherein each second fixture of the set of second fixtures further includes a body having the aperture therein, a pair of hold-in-place tabs connected to the body, a pair of spring tabs connected to the body and below the pair of hold-in-place tabs, and a flat push-down surface formed at a bottom surface of the second fixture.

9. The apparatus of claim 8, wherein the pair of hold-in-place tabs are configured to position the second fixture into one corresponding second structure and engage a pair of the top recessed portions of the one corresponding second structure.

10. The apparatus of claim 8, wherein the pair of spring tabs are configured to engage a pair of the bottom recessed portions of one corresponding second structure.

11. The apparatus of claim 8, wherein the flat push-down surface is configured to engage one corresponding second tab to hold the one corresponding second tab against the one corresponding negative terminal of the battery module.

* * * * *